United States Patent [19]

Nakanishi et al.

[11] Patent Number: 4,833,689
[45] Date of Patent: May 23, 1989

[54] ELECTRONIC CLINICAL THERMOMETER

[75] Inventors: Yasuhiro Nakanishi; Yutaka Ikemoto; Takashi Suzuki, all of Nara, Japan

[73] Assignee: Sharp Kabushiki Kaisha, Osaka, Japan

[21] Appl. No.: 939,794

[22] Filed: Dec. 9, 1986

[30] Foreign Application Priority Data

Dec. 9, 1985 [JP] Japan .................................. 60-277638

[51] Int. Cl.$^4$ .................................................. G01K 7/00
[52] U.S. Cl. ...................................... 374/170; 374/163
[58] Field of Search ............... 374/163, 170, 183, 186; 128/736; 364/557

[56] References Cited

U.S. PATENT DOCUMENTS

| 3,139,753 | 7/1964 | Brudner | 374/183 |
| 3,776,040 | 12/1973 | Gould, III | 374/183 |
| 4,176,556 | 12/1974 | Takenaka | 374/170 |
| 4,377,171 | 3/1983 | Wada | 128/736 |
| 4,447,884 | 5/1984 | Wada | 374/183 |
| 4,488,560 | 12/1984 | Takamura | 128/736 |
| 4,536,851 | 8/1985 | Germanton et al. | 374/170 |
| 4,728,199 | 3/1988 | Murai et al. | 374/170 |

FOREIGN PATENT DOCUMENTS

| 2848112 | 5/1980 | Fed. Rep. of Germany . | |
| 3318540 | 11/1984 | Fed. Rep. of Germany | 374/170 |
| 3314442 | 11/1984 | Fed. Rep. of Germany . | |
| 0113921 | 9/1980 | Japan | 374/170 |
| 0086427 | 5/1983 | Japan | 374/170 |
| 2045480 | 10/1980 | United Kingdom | 374/183 |

Primary Examiner—William A. Cuchlinski, Jr.
Assistant Examiner—Thomas B. Will
Attorney, Agent, or Firm—Birch, Stewart, Kolasch & Birch

[57] ABSTRACT

Disclosed is an electronic clinical thermometer comprising a temperature sensing unit, an arithmetic unit for calculating the body temperature from the signal from this temperature sensing unit, a display unit for displaying the body temperature converted in this arithmetic unit, a memory unit for sequentially updating and storing the measured body temperatures, and a means of calling the information in the memory unit and indicating in the display unit.

3 Claims, 5 Drawing Sheets

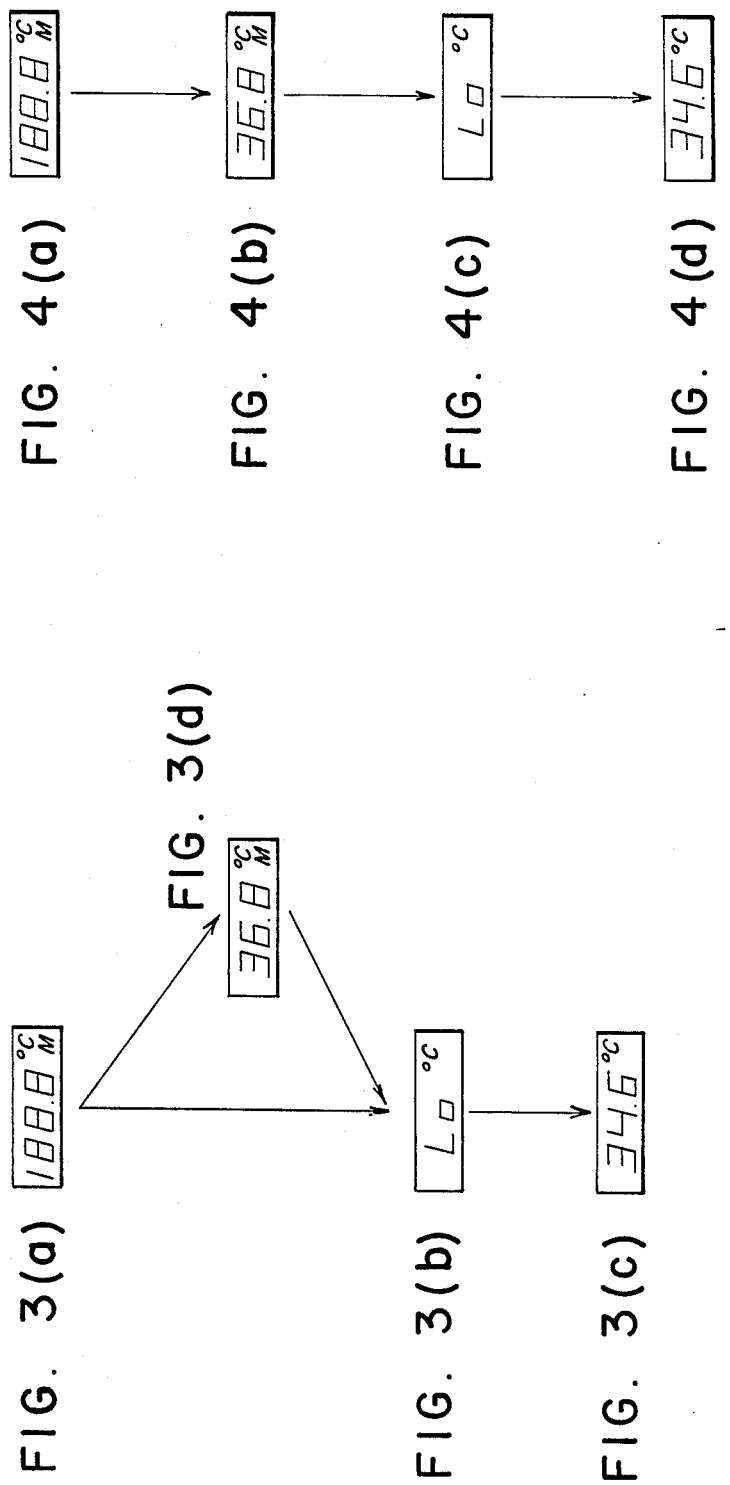

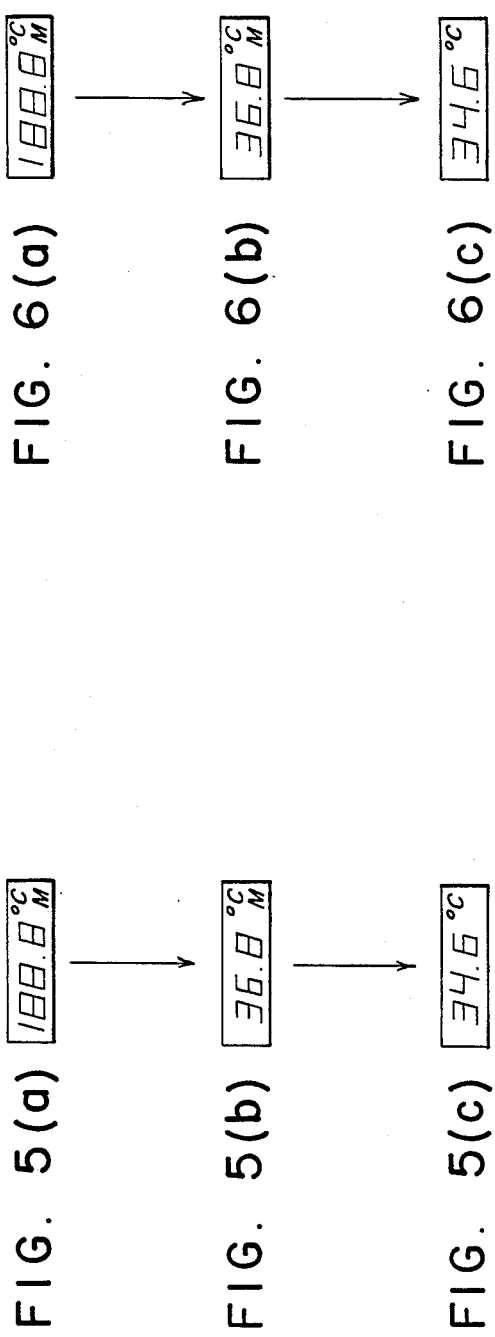

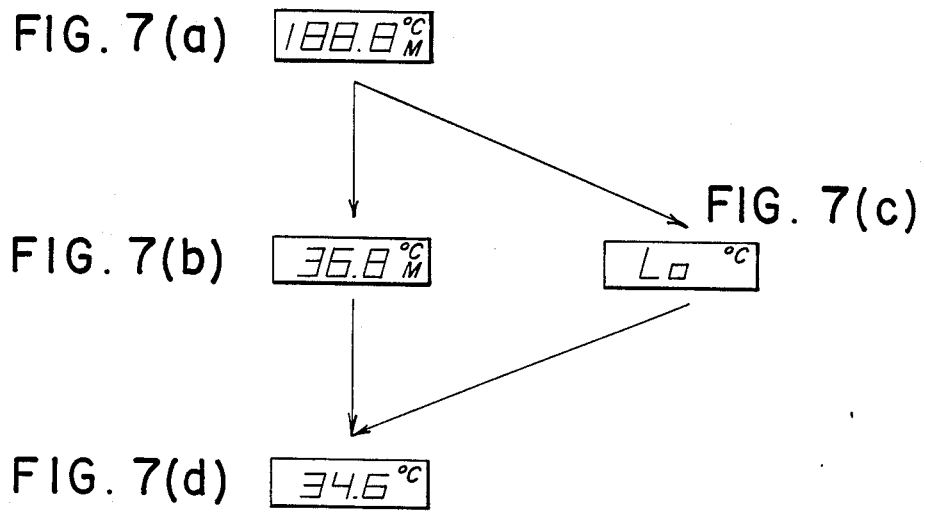

ELECTRONIC CLINICAL THERMOMETER

BACKGROUND OF THE INVENTION

This invention relates to an electronic clinical thermometer, and more particularly to a thermometer for measuring the basal temperature of women.

In an ordinary electronic clinical thermometer, the power switch is turned on before measuring the body temperature, and it is turned off after measuring and displaying the body temperture. When the power switch is turned off, the measurement disappears and cannot be recalled. Occasionally, when removing the thermometer after measuring a body temperature, the power switch may be turned off by mistake. In such a case, the measurement disappears and the body temperature must be measured again from the beginning. When measuring the basal temperature of women whose change in body temperature changes is important to note, it will be convenient if a present measurement can be compared with the most previous measurement.

SUMMARY OF THE INVENTION

It is hence a primary object of this invention to provide an electronic clinical thermometer capable of storing a body temperature measured before the power switch is turned off if the power switch is turned off after measurement of the body temperature.

It is amother object of this invention to provide an electronic clinical thermometer capable of recalling the stored measurement when the power switch is turned on again, even after the power switch has been turned off for storing the measured body temperature after measurement thereof.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modification within the spirit and scope of the invention will become apparent to those skilled in the art from the detailed description.

To achieve the above ojbects, an electronic clinical thermometer of this invention includes a temperature sensing unit, an arithmetic unit for calculating the body temperature generated by a signal from the temperature sensing unit, a display unit to display the body temperature converted in the arithmetic unit, and a memory unit to sequentially update and store the measured body temperatures, whereby the information in the memory unit is recalled as desired and displayed in the display unit.

When the temperature is measured by the temperature sensing unit, the body temperature is calculated in the arithmetic unit from the signal generated by this temperature sensing unit, and is then displayed in the display unit. On the other hand, in the memory unit, the measured body temperatures are sequentially updated and stored, and the stored information may be recalled from the memory unit by a proper means and displayed in the display unit. A power switch may be used as the means for recalling stored temperature information.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3 shows the changes in the display information of the display unit when operated along the flow chart in FIG. 2; and FIG. 4 to FIG. 7 are drawings to show other embodiments of the changes in the display information in the display unit.

DETAILED DESCRIPTION OF THE INVENTION

One of the embodiments of this invention is described below while referring to the appended drawings.

Figure 1:
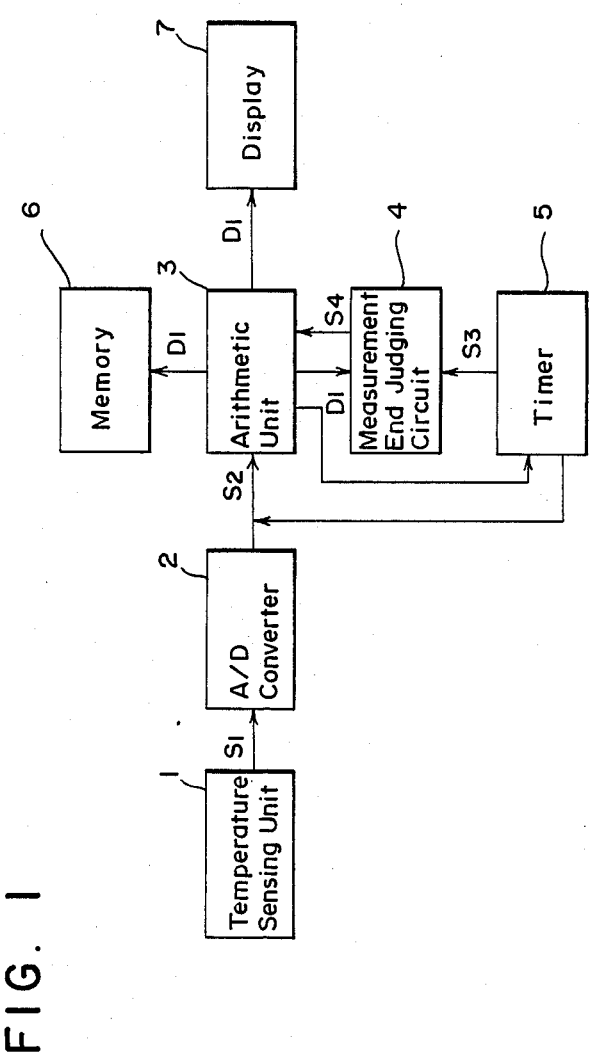
FIG. 1 is a block diagram for an electronic clinical thermometer of this invention.

FIG. 1 shows a block diagram of an electronic clinical thermometer according to the present invention.

In this drawing, numeral 1 is a temperature sensing unit composed of a temperature sensing element such as thermistor, and A/D converter 2, an arithmetic unit 3. a measurement end judging unit 4, a timer 5, a memory unit 6, and a display unit 7.

A signal S1 detected in the temperature sensing unit 1 is fed into the A/D converter 2 to be converted into a digital signal S2, which enters the arithmetic unit 3. In the arithmetic unit 3, this digital signal S2 is converted into a temperature value, and a corresponding body temperature D1 is stored in the memory unit 6 by performing various calculations, and the temperature measurement is continued. At the same time, the body temperature D1 is displayed in the display unit 7.

Additionally, the timer 5 starts counting a specified time according to a command from the arithmetic unit 3, and when the specified counting expires, the arithmetic unit 3 delivers a signal S3 to indicate the passing time to the measurement end judging unit 4, and also controls the output of the signal from the A/D converter 2. In the measurement end judging unit 4, it is judged whether to end the measurement or not based on the temperature D1 from the arithmetic unit 3 and the control signal S3 from the timer 5. On the basis of this result of judgement, a control signal S4 to end the measurement operation is fed into the arithmetic unit 3, thereby completing the measurement. At this time, the result of measurement is stored in the memory unit 6, and can be recalled at the time of next measurement.

Figure 2:
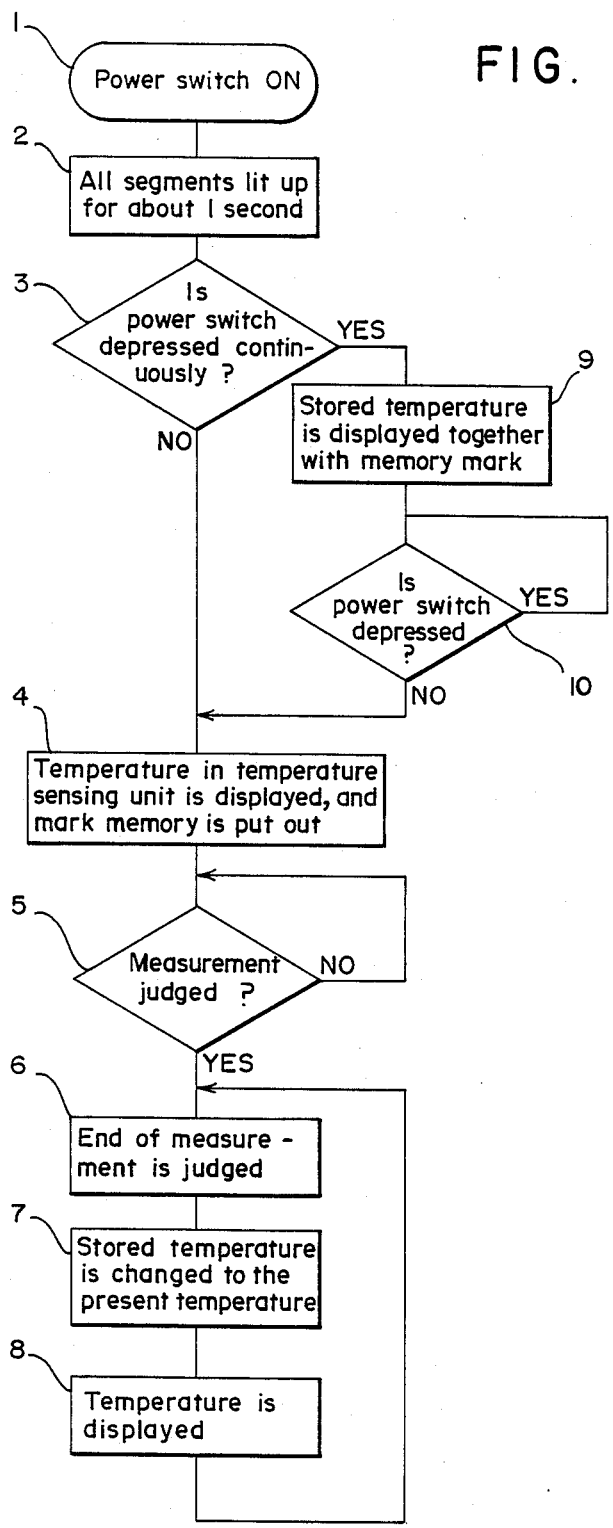
FIG. 2 is a flow chart to explain the operating sequence of the electronic clinical thermometer shown in FIG. 1.

The operating sequence of the above described electronic clinical thermometer is explained below in relation to the flow chart in FIG. 2.

In step 1, the power switch is turned on, and the thermometer begins its measurements operation. In step 2, all segments are illuminated for about one second to check the display. An example the display at this time is shown in FIG. 3. In step 3, it is determined if the power switch is kept depressed for a specified time such as one or two seconds, and if the power switch is not pressed continuously, in step 4, the temperature of temperature sensing unit 1 (ambient temperature) is displayed in the display unit 7, and a memory mark is put out.

In step 5, it is judged whether the measurement operation has begun or not, and if, the body temperature is measured. In step 6, the end of measurement is judged, and in step 7, the previous temperature stored in the memory unit 6 is sequentially replaced with the presently measured temperature, and in step 8, the presently measured temperature is displayed, and the operation returns to step 6, thereafter repeating steps 6 to 8.

In step 3, if the power switch is kept depressed continuously, in step 9, the temperature stored in the memory unit 6 is displayed in the display unit 7 together with a mark indicating that it is a stored value. In step 10, it is judged if the power switch is kept depressed continuously, and if the stored value is being displayed in the display unit 7 while it is being depressed. If the power switch is not kept depressed, the operation returns to step 4, and the same processing as mentioned above is done.

FIG. 3 shows the changes in the display information of the display unit 7 when operated by the operating sequence mentioned above. That is, the state of illuminating all segments in step 2 in FIG. 2 is shown in FIG. 3 (a), the state of indicating the ambient temperature in step 4 is shown in FIG. 3 (b), the state of indicating the present temperature (body temperature) after measurement in step 6 is shown in FIG. 3 (c), and the state of indicating the stored temperature (the previous body temperature) in the memory unit together with a mark M to indicate a stored value in step 9 is shown in FIG. 3 (d). Meanwhile, "Lo° C" indicates less than 34.5° C.

Thus, the stored temperature can be recalled by pressing the power switch continuously, and the power switch may be pushed only momentarily when not recalling the stored temperature. The stored temperature is not updated unless the next measurement is started, and the previous stored temperature can be called as many times as required by pushing the power switch.

FIG. 4 to FIG. 7 refer to other embodiments showing changes in the display information in the display unit 7.

In FIG. 4, when the power switch is turned on, all segments are illuminated for about one second to check the display (a), the automatically stored temperature (the previous body temperature) is displayed together with memory mark M for about two seconds (b), then the ambient temperature is indicated (c), and when the measurement is started the present temperature is indicated (d), thereby updating the stored temperature.

In FIG. 5, when the power swtich is turned on, all segments are illuminated in order to check the display while the power switch is being depressed (a), and when the power switch is released, the stored temperature is indicated together with the memory mark M (b), and when the measurement is started, the present temperature is indicated (c), thereby updating the stored temperature.

In FIG. 6, when the power switch is turned on, all segments are illuminated for about one second to check the display (a), and the stored temperature is indicated together with the memory mark M (b), and when the measurment is started, the present temperature is indicated (c), thereby updating the stored temperature.

FIG. 4 to FIG. 6 share a similar feature that the stored temperature is shown when the power switch is turned on.

In FIG. 7, by contrast, when the power switch is turned on, all segments are illuminated to check the display while the power switch is being depressed (a), and when this power switch is released quickly (for example, within one second), the stored temperature is indicated together with the memory mark M for about two seconds (b), and when the measurement is started, the present temperature is indicated (c), thereby updating the stored temperature. On the other hand, after displaying all segments (a), when the power switch is kept depressed, for example, for more than one second and then released, the stored temperature is cleared, and the display to indicate that the memory has been cleared appears in the display unit (d), and when the measurement is started, similarly, the present temperature is indicated (c).

What is shown in FIG. 7 lies in the feature that the stored temperature is indicated when the power switch is released quickly, and that the stored temperature is erased, accompanied by the display to show the erasure, when the power switch is depressed longer.

Thus, by using the electronic clinical thermometer of this invention, since the measurement before the power switch is turned off is stored if the power switch is turned off by mistake after measurement of body temperature, the measurement can be recalled by turning on the power switch again. Besides, since the present measurement and the previous measurement can be compared, it is particularly effective when measuring the basal temperature of women whose body temperature changes have an important meaning.

While only certain embodiments of the present invention have been described, it will be apparent to those skilled in the art that various changes and modifications may be made therein without departing from the spirit and scope of the present invention as claimed.

What is claimed is:

1. An electronic clinical thermometer comprising:
   a temperature sensing unit for sensing a body temperature and generating a signal corresponding to the sensed body temperature;
   arithmetic means for calculating a current body temperature in response to the signal generated by said temperature sensing unit;
   memory means for sequentially updating and storing a most recently measured body temperature in response to said arithmetic means calculating the current body temperature;
   display means for displaying either of said current body temperature calculated by said arithmetic means or said most recently measured body temperature stored in said memory means;
   said display means displaying the contents of said memory means by continuously depressing a power switch;
   said display means alternatively displaying said current body temperature subsequent to a most recently stored body temperature in the absence of a continuously depressed power switch, said current and most recently stored body temperatures being alternatively displayed at predetermined intervals.

2. The electronic clinical thermometer according to claim 1, further including
   means for determining the end of a body temperature measurement operation, whereby said body temperature measurement is temporarily stored in said memory means at the end of a body temperature measurement and displayed as the current temperature in said display means in the absence of said power switch being continuously depressed.

3. An electronic clinical thermometer comprising:
   a temperature sensing unit for sensing a body temperature and generating a signal corresponding to the sensed body temperature;

arithmetic means for calculating a current body temperature in response to the signal generated by said temperature sensing unit;

memory means for sequentially updating and storing a most recently measured body tempertures in response to said arithmetic means calculating the current body temperature;

display means for displaying either of said current body temperature calculated by said arithmetic means or said most recently measured body temperature stored in said memory means; and means for enabling the display of said most recently measured and memorized body temperature by continuously depressing a power switch.

* * * * *